US006713114B2

(12) United States Patent
Klein et al.

(10) Patent No.: US 6,713,114 B2
(45) Date of Patent: Mar. 30, 2004

(54) FROZEN BEVERAGE TOPPING

(75) Inventors: Barbara Klein, Champaign, IL (US); James Faller, Frisco, TX (US); Teresa Paeschke, Des Plaines, IL (US); Eleftherios Moros, Champaign, IL (US); Jennifer Grady, Omaha, NE (US); Maureen Cheng, Westmont, IL (US); Glinda Lofton, Chicago, IL (US); Lynn Magden, Champaign, IL (US); Nicole Romero, Plainfield, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 113 days.

(21) Appl. No.: 09/783,710

(22) Filed: Feb. 14, 2001

(65) Prior Publication Data

US 2002/0197355 A1 Dec. 26, 2002

(51) Int. Cl.⁷ .................................................. A23G 9/02
(52) U.S. Cl. ........................ 426/565; 426/101; 426/590; 426/584
(58) Field of Search .................................. 426/565, 101, 426/590, 584, 100, 134, 569, 570, 593, 594, 130, 316, 317, 474, 587

(56) References Cited

U.S. PATENT DOCUMENTS

| 3,935,325 A | 1/1976 | Gilmore et al. ............. 426/613 |
| 4,199,605 A | 4/1980 | Kahn et al. ............... 426/330.6 |
| 4,360,535 A | 11/1982 | Darling et al. .............. 426/570 |
| 4,399,163 A | 8/1983 | Brennan et al. ............. 426/548 |
| 4,407,838 A | 10/1983 | Rule et al. .................. 426/602 |
| 4,411,925 A | 10/1983 | Brennan et al. ............. 426/548 |
| 4,438,147 A | 3/1984 | Hedrick, Jr. ................ 426/570 |
| 4,478,867 A | 10/1984 | Zobel et al. ................ 426/570 |
| 4,689,245 A | 8/1987 | Kosikowski et al. .......... 426/72 |
| 4,746,527 A | 5/1988 | Kuypers ..................... 426/569 |
| 4,748,028 A | 5/1988 | McKenna et al. ........... 426/130 |
| 4,748,040 A | 5/1988 | Kuypers ..................... 426/569 |
| 4,784,865 A | 11/1988 | Baker et al. ................. 426/250 |
| 4,830,869 A | 5/1989 | Wimmers et al. ........... 426/595 |
| 4,985,270 A | 1/1991 | Singer et al. ............... 426/515 |
| 5,024,849 A | 6/1991 | Rasilewicz .................. 426/656 |
| 5,135,768 A | 8/1992 | Campbell et al. ........... 426/602 |
| 5,284,674 A | 2/1994 | Fazio ......................... 426/580 |
| 5,350,591 A | 9/1994 | Canton ....................... 426/564 |
| 5,366,751 A | 11/1994 | Pordy ........................ 426/580 |
| 5,462,759 A | 10/1995 | Westerbeek et al. ........ 426/568 |
| 5,480,670 A | 1/1996 | Pordy ........................ 426/580 |
| 5,721,003 A | 2/1998 | Zeller ........................ 426/580 |
| 5,780,092 A | 7/1998 | Agbo et al. ................. 426/569 |
| 5,882,716 A | 3/1999 | Munz-Schaerer et al. ... 426/591 |
| 5,997,936 A | 12/1999 | Jimenez-Laguna .......... 426/565 |
| 6,048,567 A | 4/2000 | Villagran et al. ........... 426/594 |
| 6,228,415 B1 * | 5/2001 | Jimenez-Laguna et al. . 426/565 |

OTHER PUBLICATIONS

Decker, K.J. "Making a Better Coffee Creamer" (Nov. 1999) Food Product Design pp. 71–92.

* cited by examiner

*Primary Examiner*—Keith Hendricks
(74) *Attorney, Agent, or Firm*—Greenlee, Winner and Sullivan, P.C.

(57) ABSTRACT

The invention relates to a frozen beverage topping composition which provides a frothy or foam layer to a beverage. The beverage topping composition provides creaming and can flavor, sweeten, and slightly cool coffee and other beverages. The frozen beverage topping composition of the invention may be made in non-dairy, dairy (containing non-fat dry milk and non-dairy fat), and real dairy (containing non-fat dry mile and butterfat) forms, as well as caloric and non-caloric sweetened versions. Methods of producing the frozen beverage topping composition are provided as well as methods of using the frozen beverage topping compositions.

42 Claims, 2 Drawing Sheets

FROZEN BEVERAGE TOPPING

TECHNICAL FIELD

The present invention relates to a beverage topping composition which provides a frothy or foam layer to a beverage. The beverage topping composition provides creaming and can flavor, sweeten, and slightly cool coffee and other beverages.

BACKGROUND OF THE INVENTION

Coffee beverages and other hot beverages are very popular. Coffee and other hot beverage drinkers demand a wide variety of characteristics in their beverages. Black coffee just does not suffice in today's hot beverage market. An explosion in the number of varieties of coffee drinks has occurred in recent years. It used to be that the only choices one had for coffee was cream or sugar. Now coffee drinkers desire cappuccino-style drinks, lattes, espressos, and others. Coffee drinkers are also quite discerning when it comes to other characteristics of the coffee such as texture, smoothness, body, bitterness, and so on. This desire for certain appealing coffee characteristics is manifested by an incredible number of coffee varieties now readily available to the consumer such as Kona, French Roast, Italian Roast, Arabian, Ethiopian, Tanzanian, Kenyan, Sumatran, Javanese, and Celebes to name just a few. The coffee varieties differ in a number of sensory characteristics such as body, acidity, smoothness, and flavor among many others. In respect to a variety of beverages including coffee, a particularly desirable characteristic is the quality of having a frothy or foam layer on the top of the drink.

A variety of methods are known for producing a foam layer on top of coffee. A primary example is the standard cappuccino coffee. Cappuccino-style coffees have a lower layer made of a coffee beverage and an upper layer of steamed frothy milk or cream. The coffee layer is made first and put into the beverage container and then the milk or cream is steamed and aerated to produce a froth or foam which is poured on the coffee layer. Other specialty coffee drinks are made similarly. Such methods of producing coffee drinks are usually encountered in restaurant or coffee shops and require specialized equipment. Furthermore preparation of such drinks requires a skilled operator and is time consuming.

Other methods of producing a foam layer on hot beverages are known. Such methods are based on the use of a foaming dry creamer, the use of a frozen concentrate which foams, or the use of an instant style coffee, all of which upon addition of liquid produce the desired foam or frothy layer.

U.S. Pat. No. 5,997,936 to Jimenez-Laguna et al., discloses a two-component beverage product comprising (1) a beverage-forming component and (2) a frozen milk concentrate. The two components are in proportion to form a beverage having a foamed milk layer on top of the beverage layer upon addition of liquid to the product. The frozen milk component incorporates a gas at an overrun of at least 130%. The preferred overrun is at least 150%, and more preferred at least 170%. An overrun of 200–250% was stated as desirable. A problem with this approach is that the coffee drinker is limited to the particular coffee variety used in the formulation. Furthermore, the formulations disclosed rely on either the use of instant style coffee or a coffee liquor which does not necessarily provide a particularly pleasant tasting product. Many coffee drinkers prefer fresh brewed coffee over instant coffee or coffee from coffee concentrates.

The instant cappuccino-style coffees that produce a foam layer upon addition of hot liquid generally contain an instant coffee along with sweeteners and a creamer blend containing a foaming agent which produces gas for aeration. A problem with these types of instant cappuccino-style coffees is that the creamer blend is of a different density than the unreconstituted coffee. Such instant cappuccino-style coffees are difficult to formulate in greater than one serving packages as the foaming creamer and instant coffee separate out from one another and form distinct layers. Consider a multi-serving or bulk preparation of such an instant cappuccino-style coffee: if a consumer were to spoon out a serving from a multi-serving container in which the foaming creamer and instant coffee had separated to form distinct layers, the result would be disastrous. A coffee drink with all creamer and no coffee or vice versa makes for an unhappy coffee drinker.

Attempts to circumvent the problem of differing densities of creamer and coffee were made by limiting the amount of creamer in the product. Limiting the creamer has the effect producing a less desirable taste characteristic or foam layer. Others have attempted to produce a foaming creamer with better foaming properties by providing compositions that produce carbon dioxide upon addition of water. Carbon dioxide produced foams are generally not as appealing and long lasting as other foams.

Instant style coffee products are particularly susceptible to mechanical forces that disrupt their physical integrity during normal shipping and handling. The ability of foaming creamers to foam is related their physical structure. Disruption of this structure during normal handling gives rise to a less desirable product for the consumer.

Thus there is a need for a beverage topping composition that provides a frothy or foam layer while it creams, flavors, sweetens, and provides desirable drinking characteristics, while avoiding the problems associated with the shipping, handling and formulation of currently available products.

SUMMARY OF THE INVENTION

The invention generally relates to a frozen beverage topping composition which provides a frothy or foam layer. Optionally, the frozen beverage topping composition of the invention may sweeten and/or flavor the liquid to which it is added. The frozen beverage topping comprises a composition with an overrun of less than about 130%, more preferably less than 115%, and most preferably less 100%. The invention may be used in hot or cold beverages and may be used prior to or after addition of liquid to the beverage container. The frozen beverage topping composition of the invention may be made in non-dairy, dairy, and real dairy forms, as well as caloric and non-caloric sweetened versions. The sweetness of particular embodiments varies from highly sweetened to unsweetened versions. Methods of producing the frozen beverage composition are also provided.

In a specific embodiment, the invention provides a frozen beverage topping composition which provides froth or foam. The compositions of this embodiment preferably cream, and/or slightly cool the beverage to which it is added. The frozen beverage topping composition may optionally sweeten and flavor the liquids to which it is added. Furthermore, the products of this embodiment can be made in non-dairy, dairy, and real dairy forms, as well as caloric and non-caloric sweetened versions. The products of this embodiment comprise a beverage topping composition with an overrun of less than about 130%, preferably less than about 115%, and more preferable less than about 100% overrun.

Another embodiment of the invention provides a method of making a frozen beverage topping composition. In this embodiment the method for producing a beverage whitener comprises the steps of (a) mixing together water, creamer, sweeteners and/or bulking agents, foam stabilizers, emulsifiers, and optionally flavoring; (b) pasteurizing said mixture; (c) homogenizing said mixture; (d) aerating said pasteurized, homogenized mixture to give an overrun of less than about 130%, preferably less than 115% and more preferably less than 100%; and (e) cooling said aerated mixture to a temperature sufficient to solidify the mixture.

Yet another embodiment of the invention provides a method of making a beverage with a frothy top layer. In this embodiment the compositions of the invention are added to a container before or after addition of liquid. Such liquids include coffee, tea, hot chocolate, liquor, soup, juice, and the such.

DETAILED DESCRIPTION OF THE INVENTION

Figure 1:
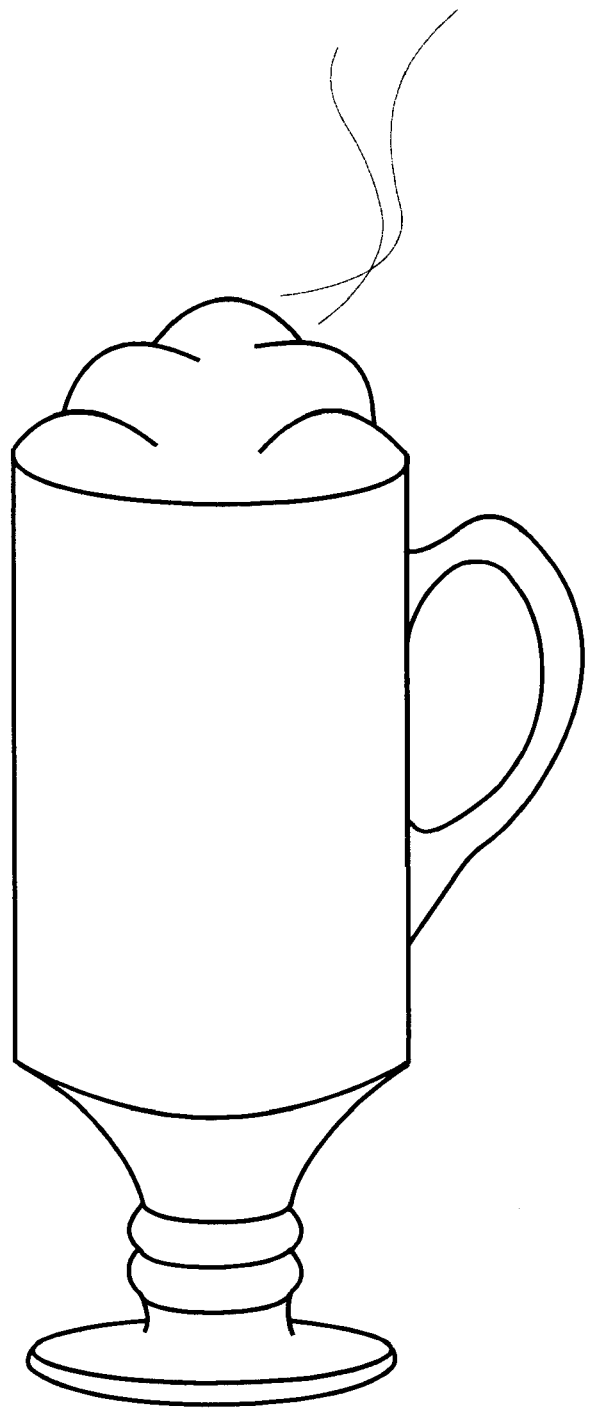
FIG. 1 is a diagram of a coffee drink prepared by addition of hot coffee to the frozen beverage topping composition of the invention.
Figure 2:
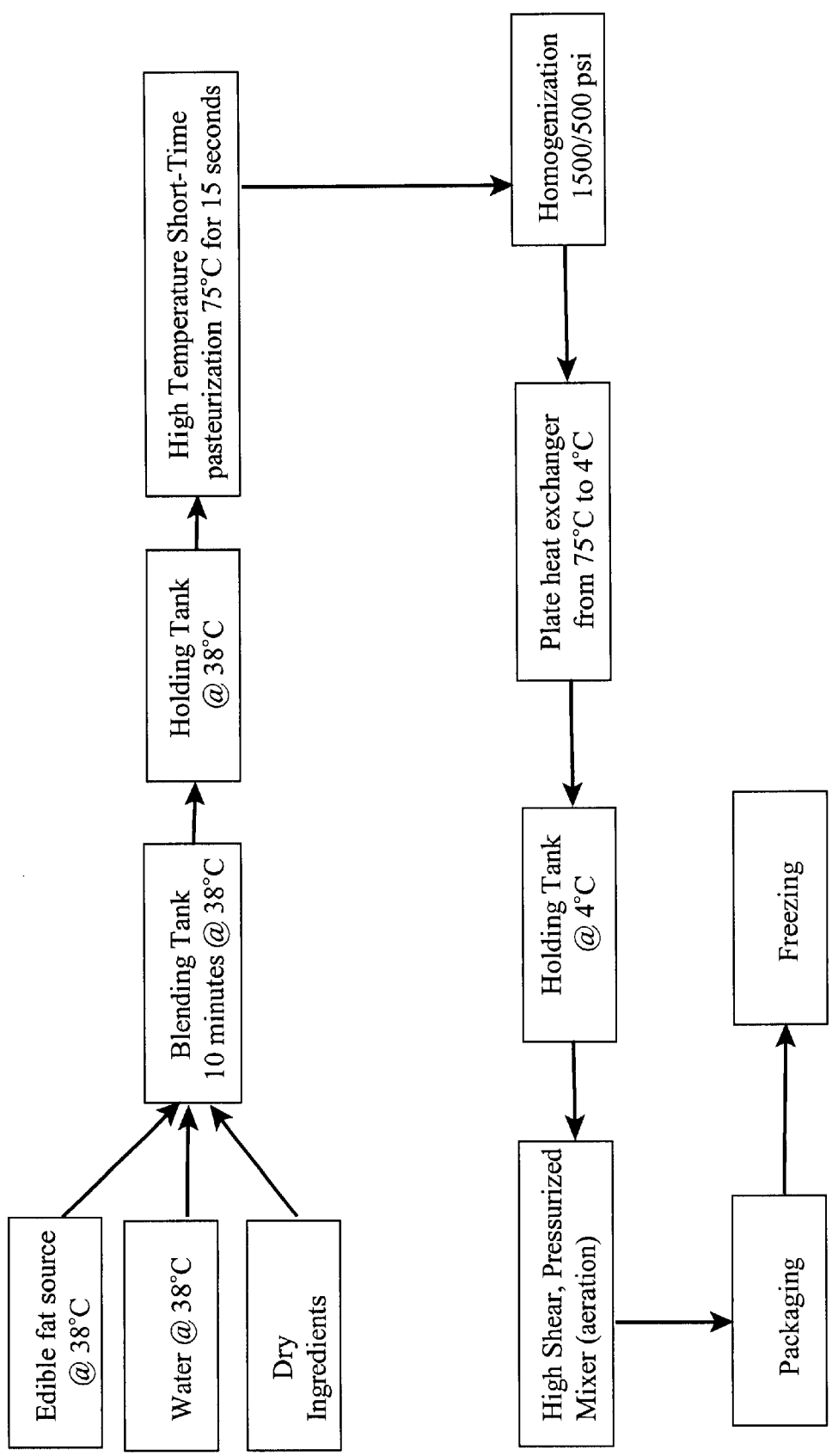
FIG. 2 is a flow chart illustrating an exemplary method of preparing the frozen beverage topping of the invention (see Example 7).

Unless stated otherwise all percentages of ingredients are given as weight percentages.

The invention generally relates to a frozen beverage topping composition which provides a frothy or foam top layer while it creams and slightly cools coffee and other beverages. The frozen beverage topping composition may optionally sweeten and/or flavor coffee and other beverages. The invention may be used in hot or cold beverages and may be used prior to or after addition of liquid to the beverage container. The frozen beverage topping composition of the invention may be made in non-dairy, dairy (containing nonfat dry milk and non-dairy fat), and real dairy (containing nonfat dry milk and butter fat) forms, as well as caloric and non-caloric sweetened versions. Highly sweetened to unsweetened versions of the frozen beverage topping compositions are within the scope of specific embodiments of the invention. Methods of producing the frozen beverage topping composition are provided as well as methods of using the frozen beverage topping compositions.

It was surprisingly discovered by the inventors that the beverage topping composition of the invention provides optimal frothing or foam formation and superior sensory characteristics when the overrun and specific gravity parameters are optimized. Preferably the overrun of the beverage composition is less than about 130%, more preferably less than about 115%, and most preferably less than about 100%. Preferably the specific gravity of the beverage composition of the invention is between from about 0.40 to about 0.75, more preferably from about 0.45 to about 0.70, and most preferably from about 0.50 to about 0.65. The specific gravity is defined as the ratio of the mass of a substance to the mass of an equal volume of water at room temperature (20–23° C.).

It was further discovered that the ratio of foam stabilizer to emulsifier plays an important role in the sensory qualities of the compositions of the invention. It was found that ratios in the range of about 0.75–1:1 of foam stabilizer to emulsifier or about 0.75–1:1 of emulsifier to foam stabilizer provided appealing sensory characteristics and long lasting stable foam. Preferably the ratio is about 0.9–1:1 for either foam stabilizer to emulsifier or emulsifier to foam stabilizer.

The invention advantageously allows the consumer to decide the type of coffee or other beverage they wish to use and provides a rich, frothy or foam layer with optimal sensory characteristics. Other uses of the compositions of the invention are contemplated including a use as a savory soup topping.

The beverage topping composition of the invention avoids problems associated with the dry foaming creamers and cappuccino-style instant coffees. Such problems include the disruption of the physical integrity or structure of the dry product that occurs during normal shipping and handling. Such structural disruption leads to less than desirable foaming properties and less than appealing sensory characteristics.

As used herein the term "beverage topping composition" refers to a composition comprising a non-dairy, dairy, or real dairy creamer; a caloric or non-caloric sweetener or a bulking agent; an emulsifier; a foam stabilizer; water; and optionally a flavorant. In a non-sweetened version of the frozen beverage topping, the sweetener is replaced with a bulking agent.

As used herein the term "beverage forming component" refers to a composition which upon addition of liquid forms a beverage. Beverage forming components can be solid or liquid.

As used herein the term "foam" or "froth" refers to a light mass formed in or on the surface of a liquid.

As used herein the term "overrun" is defined as the volume percentage of a gas in relation to gas free constituents. The overrun of the beverage topping composition of the invention is less than about 130%, preferably less than about 115%, and more preferably less than about 100%.

The creamer used in the invention may be a non-dairy, dairy, or real dairy creamer. The terms "creaming agent" and "creamer" are used interchangeable herein.

As used herein the term "non-dairy creamer" refers to a creaming agent that contains no appreciable amount of milk derived fats (butterfat) or lactose. Preferably non-dairy creamers do not contain whey constituents. Non-dairy creamers may contain caseinates. Non-dairy creamers can comprise protein and/or edible fat.

As used herein the term "dairy creamer" refers to a creaming agent having a reduced amount of milk fat. Dairy creamers can comprise non-fat dry milk and non-dairy edible fat.

As used herein the term "real dairy creamer" refers to a creaming agent which contains milk solids. Real dairy creamers can comprise non-fat dry milk and butterfat.

As used herein the term "edible fat" refers to fat or fat substitute that is not of dairy origin. Edible fats may be of vegetable origin, animal origin, or a fat substitute or mixtures thereof. Fats of vegetable origin may be partially or wholly hydrogenated vegetable oil or mixtures thereof.

As used herein the term "butterfat" refers to fat of dairy origin.

As used herein the term "sweetener" refers to a composition which may be a non-caloric (low-caloric) or caloric sweetener. Sweeteners may impart a wide range of overall sweetness to the compositions of the invention. Non-caloric (or low caloric) comprise an high intensity sweetener and a bulking agent. Caloric sweeteners comprise sugars or mixtures of sugars, such as fructose, sucrose, and so on. Bulking agents can help maintain the overall structure and integrity of the beverage topping while imparting little or no sweetening.

As used herein the term "emulsifier" refers to compositions which aid in maintaining product consistency, and more particularly to reduce surface tension to maintain fat globules in suspension. Emulsifiers generally improve stability and shelf-life.

As used herein the term "foam stabilizer" refers to a substance which affects the viscosity and surface tension of a mixture and tends to prevent rupture of bubbles formed in the mixture.

As used herein the term "flavorant" or "flavoring" refers to a substance which imparts flavor and may include natural or non-natural (synthetic) substances.

Beverage topping compositions of the invention comprise water, a creaming agent, sweetening agent, emulsifier, foam stabilizer, and optionally flavorant. For preferred ranges of components of the beverage topping composition of the invention see the following table.

| Ingredients | Generally Preferred Ranges | More Preferred Ranges | Highly Preferred Ranges |
| --- | --- | --- | --- |
| Sweetening and/or Bulking Agent | 20–50% | 20–40% | 25–35% |
| Creaming Agent | 10–30% | 13–27% | 15–25% |
| Emulsifier | 0.01–5% | 0.1–4% | 0.3–2% |
| Foam Stabilizer | 0.01–5% | 0.1–4% | 0.3–2% |
| Flavorant | 0–5% | 0.1–4% | 0.5–3% |
| Salt | 0–2% | 0.01–1.5% | 0.1–1% |
| Water | 30–60% | 35–60% | 40–55% |

In a first embodiment the beverage topping composition of the invention is a real dairy formulation, with a caloric sweetener, comprising water, non-fat dry milk, butterfat, sucrose, fructose, emulsifier, foam stabilizer, salt, and optionally flavoring. Preferred emulsifiers include sodium stearoyl lactylate and polysorbate 60. Preferred foam stabilizers include carrageenan and microcrystalline cellulose. The overrun of the beverage topping composition of this embodiment is less than about 130%, preferably less than about 115%, and more preferably less than about 100%.

In a second embodiment the beverage topping composition of the invention is a real dairy formulation with a non-caloric sweetener, comprising water, non-fat dry milk, butterfat, high intensity sweetener, bulking agent, emulsifier, foam stabilizer, salt, and optionally flavoring. Preferred emulsifiers include sodium stearoyl lactylate and polysorbate 60. Preferred foam stabilizers include carrageenan and microcrystalline cellulose. The overrun of the beverage topping composition of this embodiment is less than about 130%, preferably less than about 115%, and more preferably less than about 100%.

In a third embodiment the beverage topping composition of the invention is a dairy formulation with a non-caloric sweetener, comprising water, non-fat dry milk, edible fat, high intensity sweetener, bulking agent, emulsifier, foam stabilizer, salt, and optionally flavoring. Preferred emulsifiers include sodium stearoyl lactylate and polysorbate 60. Preferred foam stabilizers include carrageenan and microcrystalline cellulose. The overrun of the beverage topping composition of this embodiment is less than about 130%, preferably less than about 115%, and more preferably less than about 100%.

In a fourth embodiment the beverage topping composition of the invention is a dairy formulation with a caloric sweetener, comprising water, non-fat dry milk, edible fat, sucrose, fructose, emulsifier, foam stabilizer, salt, and optionally flavoring. Preferred emulsifiers include sodium stearoyl lactylate and polysorbate 60. Preferred foam stabilizers include carrageenan and microcrystalline cellulose. The overrun of the beverage topping composition of this embodiment is less than about 130%, preferably less than about 115%, and more preferably less than about 100%.

In a fifth embodiment the beverage topping composition of the invention is a non-dairy formulation with a non-caloric sweetener, comprising water, sodium caseinate, edible fat, high intensity sweetener, bulking agent, emulsifier, foam stabilizer, salt, and optionally flavoring. Preferred emulsifiers include sodium stearoyl lactylate and polysorbate 60. Preferred foam stabilizers include carrageenan and microcrystalline cellulose. The overrun of the beverage topping composition of this embodiment is less than about 130%, preferably less than about 115%, and more preferably less than about 100%.

In a six embodiment the beverage topping composition of the invention is a non-dairy formulation with caloric sweetener, comprising water, sodium caseinate, edible fat, sucrose, fructose, emulsifier, foam stabilizer, salt, and optionally flavoring. Preferred emulsifiers include sodium stearoyl lactylate and polysorbate 60. Preferred foam stabilizers include carrageenan and microcrystalline cellulose. The overrun of the beverage topping composition of this embodiment is less than about 130%, preferably less than about 115%, and more preferably less than about 100%.

In a seventh embodiment the beverage topping composition of the invention is a real dairy formulation comprising water, non-fat dry milk, butterfat, bulking agent, emulsifier, foam stabilizer, salt, and optionally flavoring. Preferred emulsifiers include sodium stearoyl lactylate and polysorbate 60. Preferred foam stabilizers include carrageenan and microcrystalline cellulose. The overrun of the beverage topping composition of this embodiment is less than about 130%, preferably less than about 115%, and more preferably less than about 100%.

In an eighth embodiment the beverage topping composition of the invention is a dairy formulation comprising water, non-fat dry milk, edible fat, bulking agent, emulsifier, foam stabilizer, salt, and optionally flavoring. Preferred emulsifiers include sodium stearoyl lactylate and polysorbate 60. Preferred foam stabilizers include carrageenan and microcrystalline cellulose. The overrun of the beverage topping composition of this embodiment is less than about 130%, preferably less than about 115%, and more preferably less than about 100%.

In a ninth embodiment the beverage topping composition of the invention is a non-dairy formulation comprising water, sodium caseinate, edible fat, bulking agent, emulsifier, foam stabilizer, salt, and optionally flavoring. Preferred emulsifiers include sodium stearoyl lactylate and polysorbate 60. Preferred foam stabilizers include carrageenan and microcrystalline cellulose. The overrun of the beverage topping composition of this embodiment is less than about 130%, preferably less than about 115%, and more preferably less than about 100%.

Suitable creaming agents for use in the invention include dairy, non-dairy, and real dairy constituents. Suitable non-diary creamers comprise edible fat and protein. Suitable dairy creamers comprise non-fat milk and edible fat. Suitable real diary creamers include, but are not limited to, whole milk solids, butterfat milk solids, and low-fat milk solids as well as mixtures including these creaming agents.

Suitable proteins for use in non-dairy creamers of the invention include, but are not limited to, whey-protein, egg-albumin, casein, caseinate, sodium caseinate and other salts of casein. A preferred protein is a caseinate.

Suitable edible fats for use in the invention may be of vegetable origin, animal origin, or a fat substitute or any mixture thereof. Fats of vegetable origin may be partially or wholly hydrogenated vegetable oil or mixtures thereof. Edible fats which may be used in the invention include, but are not limited to, coconut oil, soybean oil, cottonseed oil, palm oil, safflower oil, corn oil, sunflower oil, canola oil, including blends of such oils. Generally, it is preferred that the edible fats used in the invention have a melting temperature from about 25° C. to about 50° C. and more preferably from about 30° C. to about 45° C. A preferred edible fat for use in the invention is partially hydrogenated soybean oil.

Suitable foam stabilizers for use in the invention include, but are not limited to, natural or gums like carrageenan, guar gum, alginate, xanthan gum, and the like, or synthetic gums like methylcellulose, carboxymethylcellulose, ethylcellulose, hydroxypropyl methylcellulose, microcrystalline cellulose, and the like, and mixtures thereof The amount of these stabilizers can be generally from about 0.01% to about 5%, preferably from about 0.1% to about 1%. Preferred foam stabilizers for use in the invention include, but are not limited to, microcrystalline cellulose, carrageenan, and the like. Preferred foam stabilizers provide freeze-thaw stability and heat shock stabilization. A mixture of microcrystalline cellulose and carrageenan provides these preferred characteristics.

Suitable emulsifiers for use in the invention include, but are not limited to, lecithin, hydroxylated lecithin; mono, di, or polyglycerides of fatty acids, polyoxyethylene ethers of fatty esters of polyhydric alcohols, fatty esters of polyhydric alcohols, polyglycerol esters of mono and di glycerides such as hexaglyceryl distearate, mono- and diesters of glycols, sucrose esters and the esters of carboxylic. Many blends of emulsifiers are commercially used and readily available in accordance with known techniques. The amount of these emulsifier can generally be from about 0.05% to about 2% and more preferably from about 0.1% to about 1%. Polysorbate 60 and sodium stearoyl lactylate are preferred emulsifiers.

The blend of foam stabilizer to emulsifier helps provide the foaming action of the beverage topping compositions of the invention and further aids in maintaining the foam layer for the duration of consumption.

Suitable sweeteners for use in the invention include, but are not limited to, non-caloric, low caloric, or caloric sweeteners. Caloric sweeteners include, but are not limited to, sugars such as sucrose, fructose, dextrose, lactose, maltose, high fructose corn syrup, as well as mixtures of such sugars. Non-caloric (or low caloric) sweeteners comprise an high intensity sweetener and a bulking agent. High intensity sweeteners include, but are not limited to, aspartame, saccharin, and cyclamates. Bulking agents include, but are not limited to, maltodextrin, sorbitol, and polydextrose. Mixtures of non-caloric sweeteners with caloric sweeteners are also contemplated for use in the invention. For examples of sweeteners that can be used in the invention see U.S. Pat. Nos. 4,411,925 and 4,399,163,163 to Brennen et al.

Suitable flavors or flavorants for use in the invention include, but are not limited to, almond, almond nut, anisette, amaretto, apple, brandy, cappuccino, cherry, chicory, cinnamon, chocolate, chamomile, cinnamon spice, coco, creme, creme de menthe, Grand Mariner™, hazelnut, Irish creme, Kahlua™, lemon, macadamia nut, mint, mocha, orange, orange leaf, peppermint stick, pistachio, raspberry, Sambuca™, vanilla, and the like as well as mixtures of these flavors. Flavors or flavorants can include natural or synthetic substances or mixtures thereof.

Suitable liquids to which the frozen beverage topping composition of the invention can be added (or vice versa) included water, coffee, tea, milk, juice, liquor, hot chocolate or cocoa, soup, broth, and so on.

Suitable beverage forming components which can be used in the invention can be solid or liquid. Examples of such beverage forming components include, but are not limited to, freeze-dried coffees, coffee concentrates, powdered hot chocolate or coco, chocolate milk, dry bullions (e.g., beef, chicken, and the such), liquid broths (e.g., beef, chicken and the such), dry soup mixes liquid soup mixes, gravy mixes, powdered drink mixes (e.g., fruit, flavored, energy, and the such), frozen juice or juice flavored concentrates.

Other ingredients known to those skilled in the art may also be used in the compositions of the present invention. Typical of such ingredients are colorants, vitamins, minerals, and the like.

The foregoing ingredients may be used in their normal amounts and may vary from the representative amounts and ranges given herein.

In a preferred embodiment of the invention the ingredients for the beverage topping composition of this invention are fructose, sucrose, water, butterfat, non-fat dry milk, natural and artificial flavors, sodium stearoyl lactylate, polysorbate 60, microcrystalline cellulose, salt and carrageenan. Exemplary weight percentages are given below although these weight percentages can be varied according to various aspects and embodiments of the invention. The overrun of the beverage topping composition of this embodiment is less than about 130%, preferably less than about 115%, and more preferably less than about 100%.

| Ingredients | Percentage |
| --- | --- |
| Fructose | 15.00% |
| Sugar | 15.00% |
| Non-fat dry milk | 5.90% |
| Carrageenan | 0.10% |
| Microcrystalline cellulose | 0.49% |
| Butterfat | 14.80% |
| Sodium stearoyl lactylate | 0.29% |
| Polysorbate 60 | 0.29% |
| Salt | 0.15% |
| Flavor | 1.33% |
| Water | 46.65% |
| Total | 100.000% |

This preferred embodiment of the invention provides beverage topping composition with enhanced sweetness provided by the fructose, sucrose, and the salt. In this embodiment the fat increases the body and the mouth-feel of the product. The non-fat dry milk contains excellent flavors, nutritional value and functional properties, such as water binding, emulsification and foam formation. The heat stable natural and artificial flavors are added for the desired taste and ease in processing. The polysorbate 60 improves volume and gloss while giving emulsification stability. The sodium stearoyl lactate is another emulsifier and whipping agent. The microcrystalline cellulose and carrageenan provide foam stabilization. Furthermore, carrageenan reacts with casein to provide freeze-thaw stability. Microcrystalline cellulose is also a heat shock stabilizer and bodying agent in frozen desserts. The resulting frozen beverage topping composition when produced with an overrun of about 100%, provides a product with highly appealing sensory characteristics, while providing a foam or frothy layer and further allows the consumer to choose the type of coffee or beverage topping which they wish to use it with.

In another embodiment, the invention provides the frozen beverage topping composition together with a beverage forming component. In this embodiment liquid is added to the composition to provide a beverage with a foam or frothy layer. A preferred aspect of this embodiment relates to a product with the frozen beverage topping composition as described herein and a coffee forming beverage component. The coffee forming component can be provided as a dry coffee, i.e., freeze dried coffee or other such dry coffees, or may be provided as a coffee concentrate. In this embodiment, liquid is added to the product to form the coffee drink with a frothy or foam layer. The combination of frozen beverage topping composition and beverage forming component is advantageously provided in single serving packages or sizes. Examples of such single-serving compositions include those packaged in a manner which allows them to be easily placed into a liquid container such as a coffee cup, or alternatively the composition can be packaged in a disposable coffee cup or similar disposable container: liquid, such as water, is simple added in either case, which reconstitutes the beverage forming component and promotes the formation of the foam or frothy top layer.

Method of Preparing Frozen Beverage Topping Composition

In general, the method of producing the beverage topping composition of the invention comprises the steps of (a) mixing together water, creamer, sweeteners and/or bulking agents, foam stabilizers, emulsifiers, and optionally flavoring; (b) pasteurizing said mixture; (c) homogenizing said mixture; (d) aerating said mixture to give an overrun of less than about 130%, preferably less than 115%, and more preferably less than 100%; (e) and cooling said mixture. The resultant beverage topping composition is then packaged before being shipped to grocery stores across the country.

Pasteurization consists of a heat treatment step that destroys harmful microorganisms while minimizing the development of off-flavors. Preferably the pasteurization takes place at a temperature of 75° C. to 80° C., more preferably about 80° C. The period of heating is preferably from about 15 to about 30 seconds and more preferably from about 20 to about 25 seconds.

Homogenization is an important step in producing the compositions of the invention. Homogenization is required to produce fat globules of a particular size. In particular, the homogenization step encapsulates the fat with the protein, reduces micelle or droplet size, stabilizes the emulsion and evenly distributes air cells in the liquid. A two stage homogenization process is preferred, wherein the first stage the pressure is from about 2,000 psi to about 10,000 psi, preferably from about 2,000 psi to about 5,000 psi and more preferably from about 2250 psi to about 3000 psi. The pressure in the second stage is from about 400 psi to about 1000 psi, more preferably from about 450 psi to about 800 psi, and more preferably about 500 psi. In a highly preferred embodiment, homogenization pressures of 2500 and 500 psi in a two-stage homogenizer are used.

The aeration step in the method of making the beverage topping composition of the invention can be accomplished by a variety of methods known to those skilled in the art as long as the desired level of overrun is obtained. A preferred method of aerating the compositions of the invention is with a high shear pressurized mixer. An example of a high shear pressurized mixer that can be used in the invention is an Oakes™ continuous mixer. Other mixers of conventional design, like a Hobart mixer, are anticipated as being useful in the invention.

Packaging of the beverage topping composition of the invention can be accomplished by a variety of methods. The frozen beverage topping compositions may be packaged in single serving sizes or in bulk form.

In a preferred embodiment for producing the beverage topping composition of the invention, the process begins by metering the dry ingredients from storage bins into a mix preparation area where the ingredients are metered into one of two 500-gallon blending tanks for dry ingredients. The vegetable shortening is heated to about 38° C. so the liquid fat can be pumped into one of two blending tanks for wet ingredients. The other wet ingredients, including water at 38° C., are then metered into the tank with the shortening. Polysorbate 60 is added before the other dry ingredients to aid in emulsion formation and handling. Next the sweetener is added followed by the non-fat dry milk and then the remaining dry ingredients. The wet and dry ingredients are then mixed in another blending tank where they are heated to 38° C. and agitated for twenty minutes.

From the blending tank, the beverage topping composition is pumped to the high temperature, short time pasteurizing/homogenizing unit. The beverage topping composition is pasteurized and homogenized in this step using a special timing pump in the system. Homogenization is performed in two stages, the first stage at 2500 psi and the second stage at 500 psi. Using a plate heat exchanger, the beverage topping composition is then cooled to between 10° C. and 12° C.

The beverage topping composition is then pumped into a Oakes™ machine, which is a pressurized, high shear, continuous mixer. This provides the whipping action to incorporate air. The air that is incorporated is necessary for the frothy layer to form once the beverage topping composition is placed in hot coffee. The aeration of this step gives a final product with an overrun which is preferably less than about 130%, more preferably less than about 115%, and most preferably less than 100%.

Once aerated, the beverage topping composition is pumped to be molded in the form-fill-seal machine, which is an effective packaging for this product. This machine first uses polyethylene terephthalate (PET) sheets to thermoform into elegant or seasonal molds, which creates a higher perception of value in the mind of the consumer. PET is an inexpensive, familiar, strong, tough material, with excellent clarity, making it the ideal material for this product. Once the package is formed from PET, a comer tab is seared into the material. Volumetric filling of the product is next, followed by heat scaling a foil-based lidding material adhered with a PET lining. Volumetric filling can be run at a maximum capacity of 500 cups per minute on two lines, totaling 1000 cubs per minute. Next a punch station cuts the molds into strips of three and scores these strips to individual servings. Finished three-packs are then discharged and conveyed to a cooler that allows time for the heat seal to set. The three-packs are sent through a spiral freezer at −40° C. so as to freeze the product to −17.8° C. After freezing, the three-pack of the beverage topping composition is carried by conveyor to a robotic cartoner. Vacuum cups pick up four three-pack strips and deposit them into waiting pre-fabricated designer cartons. Cartons are then sealed in the next station. Cartons are conveyed to a case packing station where they are packed 24 to a case. These cases are then passed through a metal detector before being moved to the freezers in distribution from which they are shipped. The beverage topping composition can also be held at refrigeration temperatures (1–4° C.) for use within seven days.

Safety and Shelf-Life

The beverage topping composition of this invention has a storage stability of about 365 days in order to assure a fresh, high quality product for distribution. The average temperature of the majority of household freezers is –17.8° C. At this temperature, fluctuations in the product temperature rarely will cause perceptible damage during long time storage and will reduce ice crystal formation. This allows the beverage topping composition of this invention to have a long shelf-life plus remain a high quality product.

HACCP evaluation shows there are two critical control points (CCP) in the processing of this product. The first CCP is at the HTST pasteurization and homogenization step. The temperature for pasteurization will be monitored at 71.1° C. for 15 seconds. The second CCP is during the freezing stage. The product will be monitored so as to freeze to –18° C. using a blast freezer with the capability of reaching temperatures as low as –40° C.

EXAMPLES

The following examples are provided as illustrations of specific preferred embodiments and are not intended to limit the scope of the invention.

| Ingredient | Percent |
|---|---|
| Example 1: Real Dairy/Caloric-Sweetener Formula | |
| Crystalline Fructose | 15.00% |
| Sucrose | 15.00% |
| Non-Fat Dry Milk | 5.90% |
| Carrageenan | 0.10% |
| Microcrystalline cellulose | 0.49% |
| Butterfat | 14.80% |
| Sodium stearoyl lactylate | 0.29% |
| Polysorbate 60 | 0.29% |
| Salt | 0.15% |
| Flavor | 1.33% |
| Water | 46.65% |
| | 100.00% |
| Example 2: Real Dairy/Non-Caloric-Sweetener Formula | |
| Bulking agent | 29.82% |
| Aspartame | 0.18% |
| Non-Fat Dry Milk | 5.90% |
| Carrageenan | 0.10% |
| Microcrystalline cellulose | 0.49% |
| Butterfat | 14.80% |
| Sodium stearoyl lactylate | 0.29% |
| Polysorbate 60 | 0.29% |
| Salt | 0.15% |
| Flavor | 1.33% |
| Water | 46.65% |
| Total | 100.00% |
| Example 3: Dairy/Non-Caloric-Sweetener Formula | |
| Bulking agent | 29.82% |
| Aspartame | 0.18% |
| Non-Fat Dry Milk | 5.90% |
| Carrageenan | 0.10% |
| Microcrystalline cellulose | 0.49% |
| Edible Fat | 14.80% |
| Sodium stearoyl lactylate | 0.29% |
| Polysorbate 60 | 0.29% |
| Salt | 0.15% |
| Flavor | 1.33% |
| Water | 46.65% |
| Total | 100.00% |
| Example 4: Non-Dairy/Non-Caloric-Sweetener Formula | |
| Bulking agent | 29.82% |
| Aspartame | 0.18% |
| Sodium Caseinate | 2.00% |
| Carrageenan | 0.10% |
| Microcrystalline cellulose | 0.49% |
| Edible Fat | 14.80% |
| Sodium stearoyl lactylate | 0.29% |
| Polysorbate 60 | 0.29% |
| Salt | 0.15% |
| Flavor | 1.33% |
| Water | 50.55% |
| Total | 100.00% |
| Example 5: Non-Dairy/Caloric-Sweetener Formula | |
| Crystalline Fructose | 15.00% |
| Sucrose | 15.00% |
| Sodium Caseinate | 2.00% |
| Carrageenan | 0.10% |
| Microcrystalline cellulose | 0.49% |
| Edible Fat | 14.80% |
| Sodium stearoyl lactylate | 0.29% |
| Polysorbate 60 | 0.29% |
| Salt | 0.15% |
| Flavor | 1.33% |
| Water | 50.55% |
| Total | 100.00% |
| Example 6: Dairy/Caloric-Sweetener Formula | |
| Crystalline Fructose | 15.00% |
| Sucrose | 15.00% |
| Non-Fat Dry Milk | 5.90% |
| Carrageenan | 0.10% |
| Microcrystalline cellulose | 0.49% |
| Edible Fat | 14.80% |
| Sodium stearoyl lactylate | 0.29% |
| Polysorbate 60 | 0.29% |
| Salt | 0.15% |
| Flavor | 1.33% |
| Water | 46.65% |
| Total | 100.00% |

Example 7

Preparation of Frozen Beverage Topping Composition

This procedure can be used with any of the formulation of the invention, e.g., those set forth in examples 1–6. The appropriate amount dry ingredients from storage bins are metered into a 500-gallon blending tanks for dry ingredients. The vegetable shortening is heated to 37.8° C. so the liquid fat can be pumped into a blending tanks for wet ingredients. The other wet ingredients are then metered into the tank with the shortening. The wet and dry ingredients, which together constitute the beverage topping composition, are then mixed in another blending tank where they are heated to 37.8° C. and agitated for 20 min. Next, the beverage topping composition is pumped to the high temperature, short time pasteurizing/homogenizing unit. The beverage topping composition is pasteurized and homogenized in this step using a special timing pump in the system. Using a plate heat exchanger, the beverage topping composition is then cooled to between 10° C. and 12° C. The beverage topping composition is then pumped into a pressurized, high shear, continuous mixer to give an overrun of about 100%. Once aerated, the beverage topping composition is pumped to the form-fill-seal machine for molding and packaging. After packaging the packaged beverage topping composition is sent through a spiral freezer at −40° C. so as to freeze the product to −17.8° C.

Example 8
Sensory Evaluation of Frozen Beverage Topping Composition

A consumer taste panel was conducted with 53 participants to evaluate the attributes of overall liking, color, sweetness, and flavor for two different frozen beverage topping formulations that are within the scope of the invention. A nine-point hedonic scale was used where one indicates dislikes extremely and nine indicates likes extremely. The formulations tested did not yield statistically different results and were rated an average of six. A rating of six indicates a good consumer response.

Example 9
Preparation of Cappuccino-like Coffee Beverage

A one serving size of the frozen beverage topping was put into a coffee cup. To the frozen beverage topping in the cup was added about 8-ounces of hot coffee. After a short period of time a foam or frothy layer formed on top of the coffee as illustrated in FIG. 1.

What is claimed is:

1. A frozen beverage topping composition wherein said frozen beverage topping composition has an overrun of less than about 130%, wherein upon addition of liquid to said frozen beverage topping composition a frothy or foam layer is formed on top of said liquid and which comprises from about 25% to about 50% sweetener or bulking agent or a combination thereof, from about 10% to about 30% creaming agent, from about 0.25% to about 1% emulsifier, from about 0.01% to about 5% foam stabilizer, from about 0% to about 5% flavorant, and from about 0% to about to about 2% salt, with the remainder as water to give 100% total.

2. The frozen beverage topping composition of claim 1 wherein the creaming agent is selected from the group consisting of non-dairy, dairy, or real dairy creaming agents.

3. The frozen beverage topping composition of claim 1 wherein the ratio of foam stabilizer to emulsifier is 0.75–1:1 or the ratio of emulsifier to foam stabilizer is 0.75–1:1.

4. The frozen beverage topping composition of claim 1 which has a specific gravity from about 0.40 to about 0.75.

5. The frozen beverage topping composition of claim 1 which is a real dairy with caloric sweetener formulation.

6. The frozen beverage topping composition of claim 5 comprising water, non-fat dry milk, butterfat, sucrose, fructose, emulsifier, foam stabilizer, and salt.

7. The frozen beverage topping composition of claim 5 comprising water, non-fat dry milk, butterfat, sucrose, fructose, carrageenan, microcrystalline cellulose, sodium stearoyl lactylate, polysorbate 60, and salt.

8. The frozen beverage topping composition of claim 1 which is a real dairy with non-caloric sweetener formulation.

9. The frozen beverage topping composition of claim 8 comprising water, non-fat dry milk, butterfat, high intensity sweetener, bulking agent, emulsifier, foam stabilizer, and salt.

10. The frozen beverage topping composition of claim 8 comprising water, non-fat dry milk, butterfat, high intensity sweetener, bulking agent, carrageenan, microcrystalline cellulose, sodium stearoyl lactylate, polysorbate 60, and salt.

11. The frozen beverage topping composition of claim 1 which is a dairy with non-caloric sweetener formulation.

12. The frozen beverage topping composition of claim 11 comprising water, non-fat dry milk, edible fat, high intensity sweetener, bulking agent, emulsifier, foam stabilizer and salt.

13. The frozen beverage topping composition of claim 11 comprising water, non-fat dry milk, edible fat, high intensity sweetener, bulking agent, carrageenan, microcrystalline cellulose, sodium stearoyl lactylate, polysorbate 60, and salt.

14. The frozen beverage topping composition of claim 1 which is a dairy with caloric sweetener formulation.

15. The frozen beverage topping composition of claim 14 comprising water, non-fat dry milk, edible fat, sucrose, fructose, emulsifier, foam stabilizer, and salt.

16. The frozen beverage topping composition of claim 14 comprising water, non-fat dry milk, edible fat, sucrose, fructose, carrageenan, microcrystalline cellulose, sodium stearoyl lactylate, polysorbate 60, and salt.

17. The frozen beverage topping composition of claim 1 which is a non-dairy with non-caloric sweetener formulation.

18. The frozen beverage topping composition of claim 17 comprising water, sodium caseinate, edible fat, high intensity sweetener, bulking agent, emulsifier, foam stabilizer, and salt.

19. The frozen beverage topping composition of claim 17 comprising water, sodium caseinate, edible fat, high intensity sweetener, bulking agent, carrageenan, microcrystalline cellulose, sodium stearoyl lactylate, polysorbate 60, and salt.

20. The frozen beverage topping composition of claim 1 which is a non-dairy with caloric sweetener formulation.

21. The frozen beverage topping composition of claim 20 comprising water, sodium caseinate, edible fat, sucrose, fructose, emulsifier, foam stabilizer, and salt.

22. The frozen beverage topping composition of claim 20 comprising water, sodium caseinate, edible fat, sucrose, fructose, carrageenan, microcrystalline cellulose, sodium stearoyl lactylate, polysorbate 60, and salt.

23. The frozen beverage topping composition of claim 1 which is a non-dairy non-sweetened formulation.

24. The frozen beverage topping composition of claim 23 comprising water, sodium caseinate, edible fat, bulking agent, emulsifier, foam stabilizer, and salt.

25. The frozen beverage topping composition of claim 23 comprising water, sodium caseinate, edible fat, bulking agent, carrageenan, microcrystalline cellulose, sodium stearoyl lactylate, polysorbate 60, and salt.

26. The frozen beverage topping composition of claim 1 which is a dairy non-sweetened formulation.

27. The frozen beverage topping composition of claim 26 comprising water, non-fat dry milk, edible fat, bulking agent, emulsifier, foam stabilizer, and salt.

28. The frozen beverage topping composition of claim 26 comprising water, non-fat dry milk, edible fat, bulking agent, carrageenan, microcrystalline cellulose, sodium stearoyl lactylate, polysorbate 60, and salt.

29. The frozen beverage topping composition of claim 1 which is a real dairy non-sweetened formulation.

30. The frozen beverage topping composition of claim 29 comprising water, non-fat dry milk, butterfat, bulking agent, emulsifier, foam stabilizer, and salt.

31. The frozen beverage topping composition of claim 29 comprising water, non-fat dry milk, butterfat, bulking agent, carrageenan, microcrystalline cellulose, sodium stearoyl lactylate, polysorbate 60, and salt.

32. A method for producing a frozen beverage topping composition comprising the steps of mixing together the components of claim 1 provide a mixture; pasteurizing said mixture; homogenizing said mixture; aerating said mixture with a high shear pressurized mixer to give a final beverage topping with an overrun of less than 130%; and cooling said mixture to a temperature sufficient to solidify.

33. A method of making a beverage with a foam or frothy top layer comprising contacting the frozen beverage topping composition of claim 1 with a liquid.

34. The method of claim 33 wherein the liquid is selected from the group consisting of water, coffee, hot chocolate or cocoa, tea, juice, liquor, and soup.

35. A product of the method of claim 32.

36. A frozen beverage topping composition produced by preparing a mixture of about 25% 50% sweetener, from about 10% to about 30% creamer, from about 0.25% to about 1% emulsifier, from about 0.0 1% to about 5% foam stabilizer, from about 0% to about 5% flavorant, and from about 30% to about 60% water; wherein said composition has an overrun of less than 130% and wherein upon addition of liquid to said frozen beverage topping composition a frothy or foam layer is formed on top of the beverage.

37. The frozen beverage topping composition of claim 1 further comprising a beverage forming component.

38. The frozen beverage topping composition of claim 37 wherein the beverage forming component forms coffee.

39. The frozen beverage topping composition of claim 1 wherein the sweetener is selected from the group consisting of sucrose, fructose, dextrose, lactose, maltose, high fructose corn syrup, aspartame, saccharin, cyclamates, and mixtures thereof.

40. The frozen beverage topping composition of claim 1 wherein the bulking agent is selected from the group consisting of maltodextrin, sorbitol, polydextrose and mixtures thereof.

41. The frozen beverage topping composition of claim 1 wherein the emulsifier is selected from the group consisting of lecithin, hydroxylated lecithin, a monoglyceride of a fattty acid, a diglyceride of a fatty acid, a polyglyceride of a fatty acid, a polyoxyethylene ether of a fatty ester of a polyhdric alcohol, a fatty ester of a polyhydric alcohol, hexaglyceryl distearate, mono- and diesters of glycols, sucrose esters and mixtures thereof.

42. The frozen beverage topping composition of claim 1 wherein the foam stabilizer is selected from the group consisting of carrageenan, quar gum, alginate, xanthan gum, methylcellulose, carboxymethylcellulose, ethylcellulose, hydroxypropyl methylcellulose, microcrystalline cellulose, and mixtures thereof.

* * * * *

UNITED STATES PATENT AND TRADEMARK OFFICE
CERTIFICATE OF CORRECTION

PATENT NO. : 6,713,114 B2
DATED : March 30, 2004
INVENTOR(S) : Klein et al.

It is certified that error appears in the above-identified patent and that said Letters Patent is hereby corrected as shown below:

Column 15,
Line 1, insert -- to -- after "Claim 1."
Line 14, insert -- to about -- between "25%" and "50%".

Column 16,
Line 15, delete "polyhdric" and replace with -- polyhydric --.

Signed and Sealed this

Tenth Day of May, 2005

JON W. DUDAS
*Director of the United States Patent and Trademark Office*